(12) United States Patent
Kawada (10) Patent No.: US 9,046,243 B2
(45) Date of Patent: *Jun. 2, 2015

(54) BACKLIGHT MODULE

(71) Applicant: Funai Electric Co., Ltd., Daito, Osaka (JP)

(72) Inventor: Kazuaki Kawada, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/097,896

(22) Filed: Dec. 5, 2013

(65) Prior Publication Data

US 2014/0092337 A1 Apr. 3, 2014

Related U.S. Application Data

(63) Continuation of application No. 12/430,152, filed on Apr. 27, 2009, now Pat. No. 8,622,565.

(30) Foreign Application Priority Data

Aug. 20, 2008 (JP) .................................. 2008-211261

(51) Int. Cl.
  *G09F 13/04* (2006.01)
  *G09F 13/08* (2006.01)
  (Continued)

(52) U.S. Cl.
  CPC ............ *F21V 7/04* (2013.01); *G02F 1/133605* (2013.01)

(58) Field of Classification Search
  CPC ................................................. G02F 1/133605
  USPC .......... 362/97.1–97.2, 217.01–225, 632–634; 349/58
  See application file for complete search history.

(56) References Cited

U.S. PATENT DOCUMENTS

| 5,134,548 A | 7/1992 | Turner |
| 5,568,680 A | 10/1996 | Parker |
| 6,464,378 B1 | 10/2002 | Reed et al. |

(Continued)

FOREIGN PATENT DOCUMENTS

| JP | 54-030095 A | 9/1979 |
| JP | 09-216618 A | 8/1997 |

(Continued)

OTHER PUBLICATIONS

Extended European Search Report of the corresponding European Application No. 09 161 741.5, dated Sep. 4, 2009.

(Continued)

*Primary Examiner* — Jason Moon Han
(74) *Attorney, Agent, or Firm* — Global IP Counselors, LLP (57) ABSTRACT

A backlight module includes at least one light source, a light reflecting member, and a frame. The light reflecting member includes a center reflecting part, two first peripheral reflecting parts, two second peripheral reflecting parts, and two extension parts. The extension parts extend from either first upper bases of the first peripheral reflecting parts or second upper bases of the second peripheral reflecting parts, respectively. The center reflecting part, the first peripheral reflecting parts, the second peripheral reflecting parts and the extension parts are integrally formed as a one-piece, unitary member. The extension parts of the light reflecting member are disposed on either first side parts of the frame or second side parts of the frame, respectively.

26 Claims, 3 Drawing Sheets

(51) Int. Cl.
*F21V 7/04* (2006.01)
*G02F 1/1335* (2006.01)

(56) References Cited

U.S. PATENT DOCUMENTS

| | | | |
|---|---|---|---|
| 7,057,678 B2 * | 6/2006 | Ishida et al. | 349/58 |
| 7,883,236 B2 | 2/2011 | Vanden Eynden | |
| 2003/0002279 A1 | 1/2003 | Fiene | |
| 2004/0012971 A1 | 1/2004 | Tsai et al. | |
| 2007/0047225 A1 * | 3/2007 | Sudo | 362/225 |
| 2007/0230206 A1 | 10/2007 | Hsiao et al. | |
| 2008/0047181 A1 * | 2/2008 | Sakai | 40/546 |
| 2008/0079865 A1 | 4/2008 | Kang et al. | |
| 2009/0027584 A1 * | 1/2009 | Han et al. | 349/58 |
| 2009/0268473 A1 | 10/2009 | Ohnishi et al. | |

FOREIGN PATENT DOCUMENTS

| | | |
|---|---|---|
| JP | 2004-055182 A | 2/2004 |
| JP | 2004-102119 A | 4/2004 |
| JP | 2005-322645 A | 11/2005 |
| WO | 2006-003913 A1 | 1/2006 |

OTHER PUBLICATIONS

Office Action of the corresponding European Application No. 09 161 741.5, dated Jul. 26, 2011.

* cited by examiner

BACKLIGHT MODULE

CROSS-REFERENCE TO RELATED APPLICATIONS

This is a continuation application of U.S. application Ser. No. 12/430,152, which claims priority to Japanese Patent Application No. 2008-211261, filed on Aug. 20 2008. The entire disclosures of U.S. patent application Ser. No. 12/430,152 and Japanese Patent Application No. 2008-211261 are hereby incorporated herein by reference.

BACKGROUND OF THE INVENTION

1. Field of the Invention

The present invention generally relates to a backlight module. More specifically, the present invention relates to a backlight module with a light source.

2. Background Information

A conventional liquid crystal module includes a liquid crystal cell and a backlight device. The backlight device is disposed directly behind the liquid crystal cell.

The backlight device mainly includes a linear light source, a light reflecting member, a plurality of optical sheets and a frame. The linear light source includes a straight tube or U-tube fluorescent tube. Electrodes at the ends of the linear light source are fitted into a power socket. The light reflecting member is disposed at the back of the linear light source. The light reflecting member includes a reflecting face. The light from the linear light source is reflected by the light reflecting member, and shines from the back onto the liquid crystal cell. The optical sheets include a light diffusing plate, and are disposed in the required type and number between the light reflecting member and the liquid crystal cell. The light reflected by the reflecting face of the light reflecting member passes through the optical sheets, and shines on the liquid crystal cell from the back, which maintains the brightness balance of an image display face of the liquid crystal cell. The frame supports the linear light source, the light reflecting member and the optical sheets. The frame is made of molded resin or sheet metal.

The linear light source and the light reflecting member are mounted in the frame. All or substantially all of the surface of the light reflecting member is a reflecting face. The reflecting face is divided into one wide, rectangular center region located at the back of the linear light source, and slender, trapezoidal peripheral regions that are raised up in a slanted orientation from four sides of the center region.

With the conventional backlight device, the light reflecting member is formed by combining a sheet that can be bent, and frame pieces. The frame pieces are formed from resin by injection molding.

The sheet is bent along straight bending lines set at places near the two long sides, and has a silhouette shape that is substantially rectangular. The sheet is bent and held so that the rectangular center region and two of the trapezoidal peripheral regions on either side of the center region are formed in the sheet. In the two peripheral regions formed by the sheet, the ends in the lengthwise direction of each of the peripheral regions are formed in a shape such that the spacing between the ends of each of the peripheral regions widens moving away from the bending lines. Thus, the peripheral regions are formed in a trapezoidal shape.

The frame piece is a resin molding formed by injection molding. The frame piece has a slender, slanted, trapezoidal reflecting face. The frame pieces are disposed symmetrically on either side in the lengthwise direction of the sheet. The slender, trapezoidal reflecting faces of the frame pieces are used as the other two peripheral regions. The ends of the slender, trapezoidal reflecting faces of the frame pieces are butted against the ends of the slender, trapezoidal peripheral regions formed by the sheet, and the butting configuration of the four peripheral regions forms a rectangular shape.

Meanwhile, with another conventional backlight device, the light from a light source is reflected by a reflecting plate (see Japanese Laid-Open Patent Application Nos. 2004-102119 and 2004-55182, for example). In the conventional backlight device, uneven brightness is avoided by providing a peaked portion to the reflecting plate. Furthermore, warping of the reflecting plate is prevented by using a multilayer structure for the reflecting plate.

However, when the light reflecting member is a combination of the sheet with the two frame pieces, three components are required to form the light reflecting member, namely, the sheet and the two frame pieces. This not only increases the cost, but also makes the assembly process more complicated and diminishes productivity.

In view of the above, it will be apparent to those skilled in the art from this disclosure that there exists a need for an improved backlight device. This invention addresses this need in the art as well as other needs, which will become apparent to those skilled in the art from this disclosure.

SUMMARY OF THE INVENTION

The present invention is conceived in light of the above-mentioned problems. One object of the present invention is to provide a backlight module whose production cost is reduced.

In accordance with one aspect of the present disclosure, a backlight module includes at least one light source, a light reflecting member, and a frame. The at least one light source is configured to emit light. The light reflecting member is arranged to reflect the light emitted from the light source. The light reflecting member includes a center reflecting part, two first peripheral reflecting parts, two second peripheral reflecting parts, and two extension parts. The center reflecting part has two first opposite side portions and two second opposite side portions. The first peripheral reflecting parts each have a first trapezoidal shape with a first lower base and a first upper base that is longer than the first lower base. The first lower bases are connected to the first opposite side portions of the center reflecting part, respectively, such that the first peripheral reflecting parts extend from the first opposite side portions of the center reflecting part, respectively. The second peripheral reflecting parts each have a second trapezoidal shape with a second lower base and a second upper base that is longer than the second lower base. The second lower bases are connected to the second opposite side portions of the center reflecting part, respectively, such that the second peripheral reflecting parts extend from the second opposite side portions of the center reflecting part, respectively. The extension parts extend from either the first upper bases or the second upper bases, respectively. The center reflecting part, the first peripheral reflecting parts, the second peripheral reflecting parts and the extension parts are integrally formed as a one-piece, unitary member. The frame includes a bottom part, two first side parts and two second side parts. The first and second side parts extend frontward from peripheral portions of the bottom part with respect to the bottom part, respectively. The first and second side parts define an interior of the frame therebetween. The light reflecting member is arranged with respect to the frame while the light reflecting member is attached to the frame such that the center reflecting part, the first peripheral reflecting parts and the second peripheral reflecting parts are disposed within the interior of the frame, and such that the extension parts are disposed on either the first side parts or the second side parts, respectively.

These and other objects, features, aspects and advantages of the present invention will become apparent to those skilled in the art from the following detailed descriptions, which, taken in conjunction with the annexed drawings, disclose selected embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENT

Selected embodiments of the present invention will now be explained with reference to the drawings. It will be apparent to those skilled in the art from these disclosures that the following descriptions of the selected embodiments of the present invention are provided for illustration only and not for the purpose of limiting the invention as defined by the appended claims and their equivalents.

First Embodiment

Figure 1:
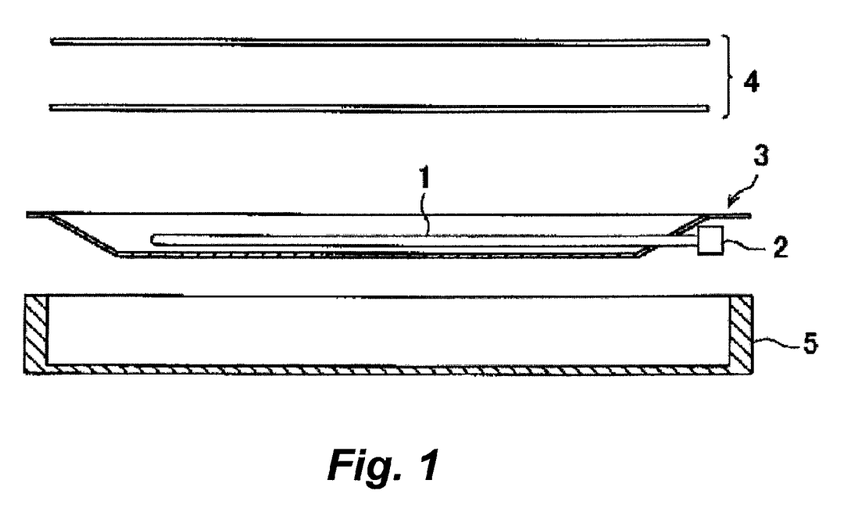
FIG. 1 is a cross sectional view of a backlight device for a liquid crystal module in accordance with a first embodiment of the present invention.
Figure 5:
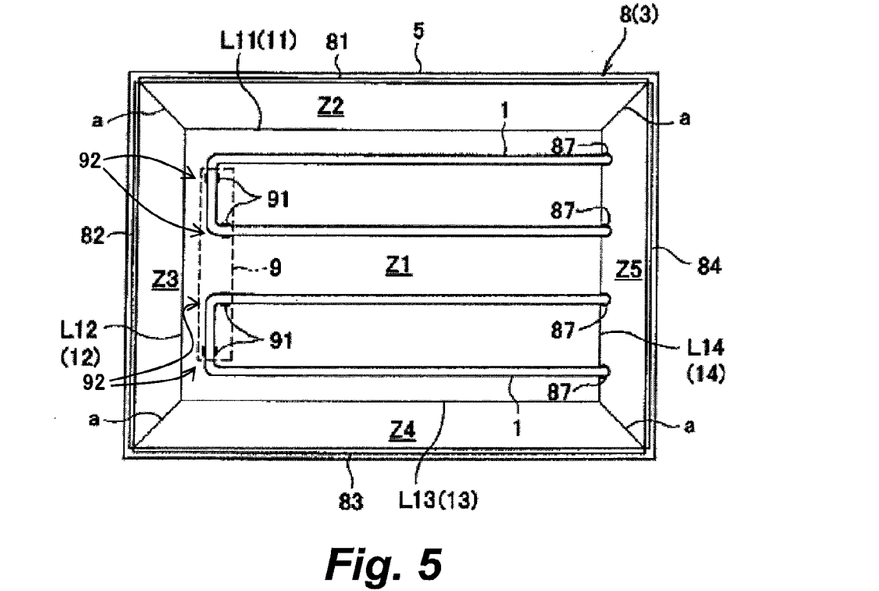
FIG. 5 is a front elevational view of the backlight device illustrated in FIG. 1.

A liquid crystal module (e.g., a display device) includes a liquid crystal cell (e.g., a liquid crystal panel) (not shown) and a backlight device (e.g., a backlight module). The backlight device is disposed directly behind the liquid crystal cell. As shown in FIGS. 1 and 5, the backlight device mainly includes a pair of linear light sources 1 (e.g., light sources), a light reflecting member 3, a plurality of optical sheets 4 and a frame 5. The linear light sources 1 emit light. Each of the linear light sources 1 includes a U-shaped fluorescent tube. The linear light source 1 has electrodes at ends of the linear light source 1. The electrodes are inserted into power sockets 2 (e.g., electric connectors) to supply electronic power to the linear light source 1. The light reflecting member 3 is disposed at the back (e.g., the rear side) of the linear light source 1, and has a reflecting face. The light from the linear light source 1 is reflected by the light reflecting member 3, and shines from the back toward the liquid crystal cell. The light reflecting member 3 is formed as a one-piece, unitary member. The optical sheets 4 includes a light diffusing plate, and are disposed in the required type and number between the light reflecting member 3 and the liquid crystal cell. The light reflected by the reflecting face of the light reflecting member 3 passes through the optical sheets 4, and shines on the liquid crystal cell from the back. As a result, the brightness balance of a display face of the liquid crystal cell is maintained. The linear light source 1, the light reflecting member 3 and the optical sheets 4 are supported on the frame 5. The frame 5 is made of molded resin or sheet metal.

Figure 2:
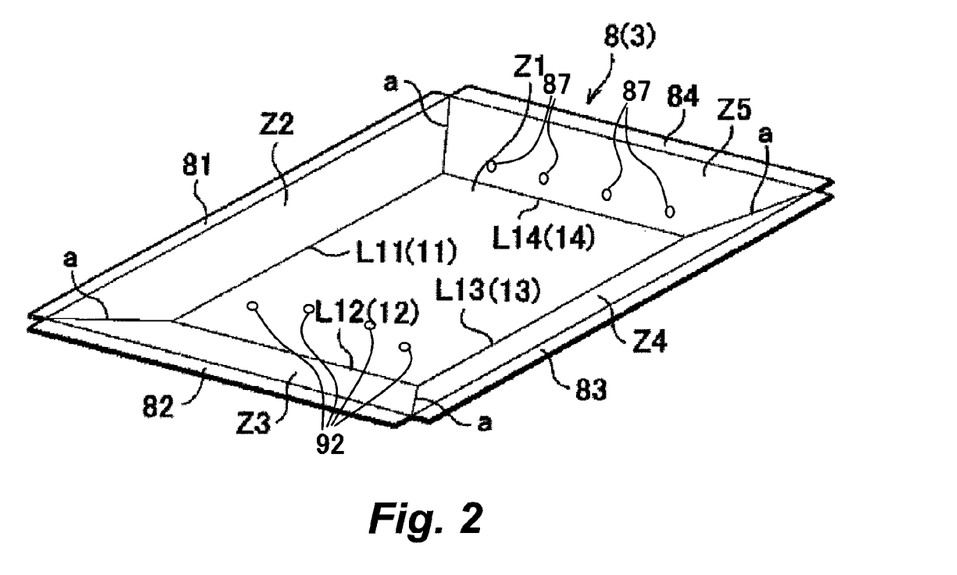
FIG. 2 is a perspective view of a light reflecting member of the backlight device illustrated in FIG. 1.

As shown in FIG. 2, the light reflecting member 3 is made of a sheet (e.g., sheet-like member) 8. The entire light reflecting member 3 is formed by just the single sheet 8 as a one-piece, unitary member. In other words, the light reflecting member 3 is not formed by combining a sheet with frame pieces, as the conventional light reflecting member. All or substantially all of the surface of the light reflecting member 3 is a reflecting face.

The sheet 8 has a center region (e.g., a center reflecting face or a center reflecting part) Z1, a pair of top and bottom peripheral regions (e.g., a pair of first peripheral reflecting faces or first peripheral reflecting parts) Z2 and Z4, and a pair of left and right trapezoidal peripheral regions (e.g., a pair of second peripheral reflecting faces or second peripheral reflecting parts) Z3 and Z5. The center region Z1 is formed in a rectangular shape. The center region Z1 is located at the back of the linear light source 1. The peripheral regions Z2, Z3, Z4, and Z5 are formed in a trapezoidal shape. The peripheral regions Z2, Z3, Z4, and Z5 are raised up in a slanted orientation from four sides 11, 12, 13, and 14 of the center region Z1. Specifically, the top and bottom peripheral regions Z2 and Z4 extend from top and bottom long side portions (e.g., first opposite side portions) of the center region Z1 frontward and outward with respect to the center region Z1. The left and right peripheral regions Z3 and Z5 extend from left and right short side portions (e.g., second opposite side portions) of the center region Z1 frontward and outward with respect to the center region Z1. The sheet 8 is bent at four places around the periphery of the center region Z1 along straight bending lines (e.g., bent portions) L11, L12, L13, and L14, which forms the peripheral regions Z2, Z3, Z4, and Z5, and also forms the center region Z1 having the four sides 11, 12, 13, and 14 that are formed by the bending lines L11, L12, L13, and L14. Therefore, the center region Z1 has a wide, rectangular region bounded by the four sides 11, 12, 13, and 14. Also, the peripheral regions Z2, Z3, Z4, and Z5 has slender, trapezoidal regions that are raised up in the slanted orientation from the four sides 11, 12, 13, and 14 of the center region Z1, respectively.

Figure 3:
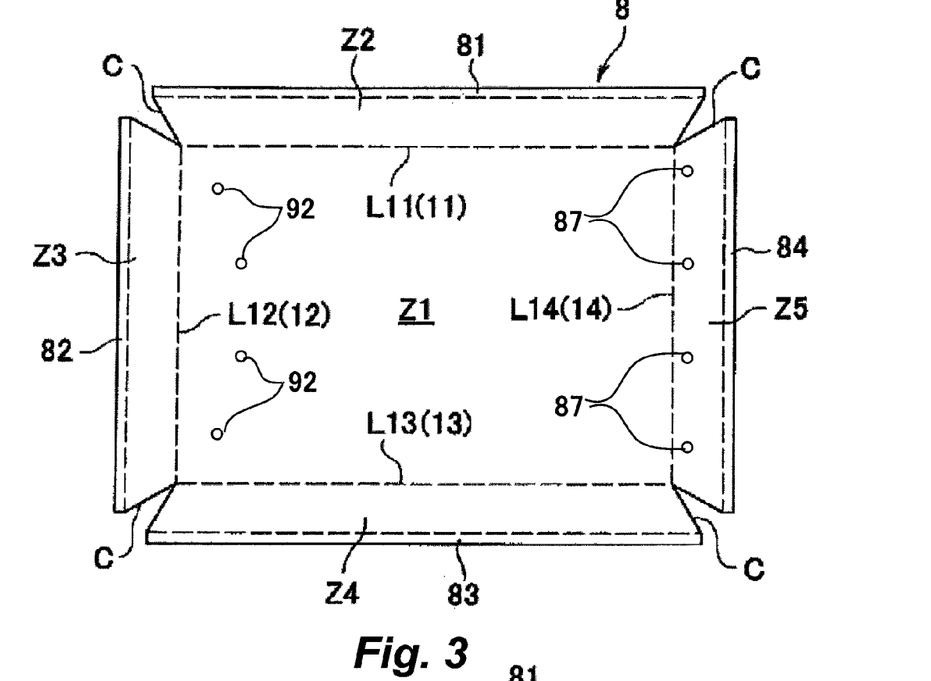
FIG. 3 is a development view of the light reflecting member illustrated in FIG. 2.

When the sheet 8 is spread out as shown in FIG. 3, the sheet 8 has a shape in which V-shaped cuts C having the same shape are formed at four corners of a rectangular sheet material. The straight lines that connect the bottom points (e.g., the vertex) of the cuts C correspond to the bending lines L11, L12, L13, and L14. The rectangular region bounded by the bending lines L11, L12, L13, and L14 corresponds to the center region Z1. Therefore, the places where the bending lines L11, L12, L13, and L14 are formed correspond to the four sides 11, 12, 13, and 14 of the center region Z1.

Outer regions of the four bending lines L11, L12, L13, and L14 are trapezoidal in shape. The trapezoidal regions correspond to the peripheral regions Z2, Z3, Z4, and Z5. With the sheet 8, slender extension tabs 81, 82, 83, and 84 (e.g., extension parts) are provided to outer edges of the peripheral regions Z2, Z3, Z4, and Z5, respectively. The extension tabs 81, 82, 83, and 84 are narrow in width.

When the trapezoidal regions are bent in the slanted orientation along the four straight bending lines L11, L12, L13, and L14, and the sheet 8 is held in the shape shown in FIG. 2, this forms the center region Z1 and the peripheral regions Z2, Z3, Z4, and Z5 that are raised up in the slanted orientation from the four sides 11, 12, 13, and 14 of the center region Z1, respectively. In between each one of adjacent pairs of the peripheral regions Z2, Z3, Z4, and Z5 that are adjacent to one another and flank respective one of the corners of the rectangular center region Z1 (e.g., the peripheral regions Z2 and Z3, the peripheral regions Z3 and Z4, the peripheral regions Z4 and Z5, and the peripheral regions Z5 and Z2), the ends (e.g., end portions or side end portions) of the peripheral regions Z2, Z3, Z4, and Z5 are butted together to form butt joints (e.g., corner sections) a so that there is no gap in between. The extension tabs 81, 82, 83, and 84 of the outer edges of the peripheral regions Z2, Z3, Z4, and Z5 are bent outward. The extension tabs 81, 82, 83, and 84 correspond to the portions supported by the frame 5 as shown in FIG. 1.

As shown in FIG. 5, the U-shaped fluorescent tubes are used for the linear light source 1. The end electrodes of the linear light source 1 are connected to the power sockets 2 disposed in the empty space at the back of the peripheral region Z5 of the sheet 8. The linear light source 1 passes through holes 87 formed in the peripheral region Z5 and sticks out to the rear of the peripheral region Z5, where it is connected to the power sockets 2. Each of the through holes 87 has a closed hole with a continuous periphery. On the back side of the sheet 8, a fixing piece 9 is affixed to the frame 5. The fixing piece 9 has clamps 91. The clamps 91 stick out to the front side of the sheet 8 from openings 92 made at places on the center region Z1 of the sheet 8. The clamps 91 support the linear light sources 1 at suitable locations, such as the two locations of the bent portion shown in FIG. 5.

With the backlight device, the light reflecting member 3 is formed by just a single sheet 8, and furthermore the sheet 8 is formed by bending a substantially rectangular sheet material with the shape shown in FIG. 3 at an angle and at four places around the periphery of the material. Thus, the cost of producing the light reflecting member 3 is markedly lower than the conventional light reflecting member. Also, the assembly process for the light reflecting member 3 involves merely bending a single sheet material at four places around its periphery and at an angle. Thus, the process is much simpler than the conventional light reflecting member that requires skill to combine the sheet with the frame pieces. Therefore, this promotes a simpler assembly process for the backlight device, and the productivity tends to be higher. Furthermore, no gaps are produced at the boundary between each one of the adjacent pairs of the peripheral regions Z2, Z3, Z4, and Z5 (e.g., at the butt joints a). As a result, the light is appropriately reflected, and it is unlikely that the brightness of the liquid crystal cell is uneven.

With the backlight device, the reflecting faces are formed on the light reflecting member 3. Specifically, the center region Z1 located at the back of the linear light source 1 and the peripheral regions Z2, Z3, Z4, and Z5 that are raised up in a slanted orientation from the four sides 11 to 14 of the center region Z1, are all formed by just the one sheet 8. Accordingly, there is no need to form the center region Z1 and the peripheral regions Z2, Z3, Z4, and Z5 by combining the conventional sheet with the conventional frame pieces. Thus, the light reflecting member 3 can be formed by just the one sheet 8. As a result, there is no need to using extra components such as the frame pieces, and the number of parts that are needed can be correspondingly reduced. This promotes a simpler assembly process. Furthermore, the sheet 8 is more readily available and much less expensive than a resin molding formed by injection molding, which is expensive and demands sophisticated technology, as with the conventional frame pieces. Therefore, with the backlight device, it is possible to provide a backlight device much more inexpensively. Furthermore, this helps reduce the weight of the backlight device.

Figure 6:
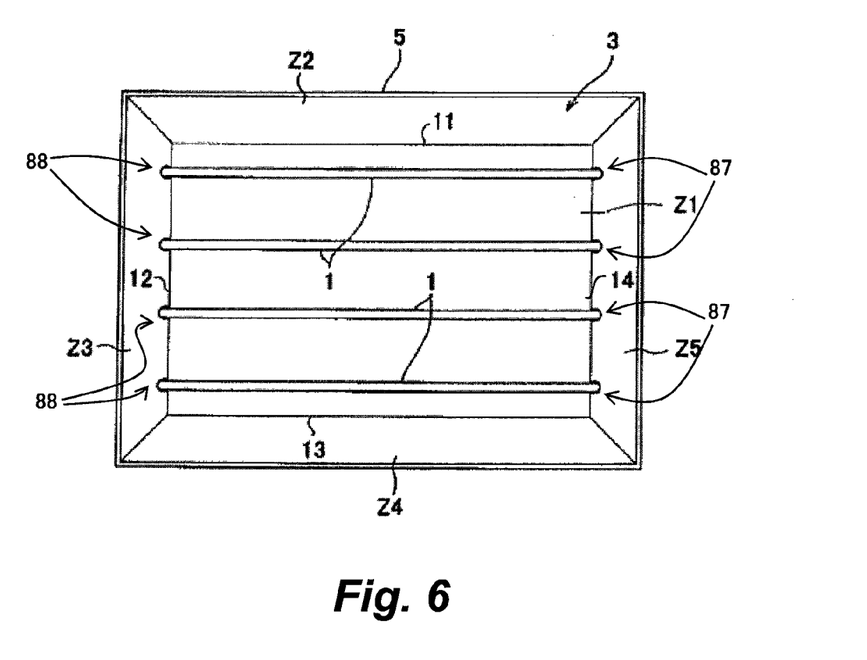
FIG. 6 is a front elevational view of another example of the backlight device.

As shown in FIG. 5, the linear light sources 1 include the U-shaped fluorescent tubes, and the bent portions of the linear light sources 1 are supported by the clamps 91 at locations between the peripheral regions Z3 and Z5. However, the bent portions of the linear light sources 1 can be positioned on the back side of the peripheral region Z3, and be supported by clamps formed on the frame 5 at locations back side of the peripheral region Z3. In this case, the peripheral region Z3 also has through holes through which the linear light sources 1 are disposed. Furthermore, as shown in FIG. 6, the linear light sources 1 can include a plurality of (four in FIG. 6) straight tubes. In this case, the peripheral region Z3 has two pairs of through holes 88 through which the left end portions of the linear light sources 1 are disposed, and the peripheral region Z5 has two pairs of through holes 87 through which the right end portions of the linear light sources 1 are disposed.

Second Embodiment

Figure 4:
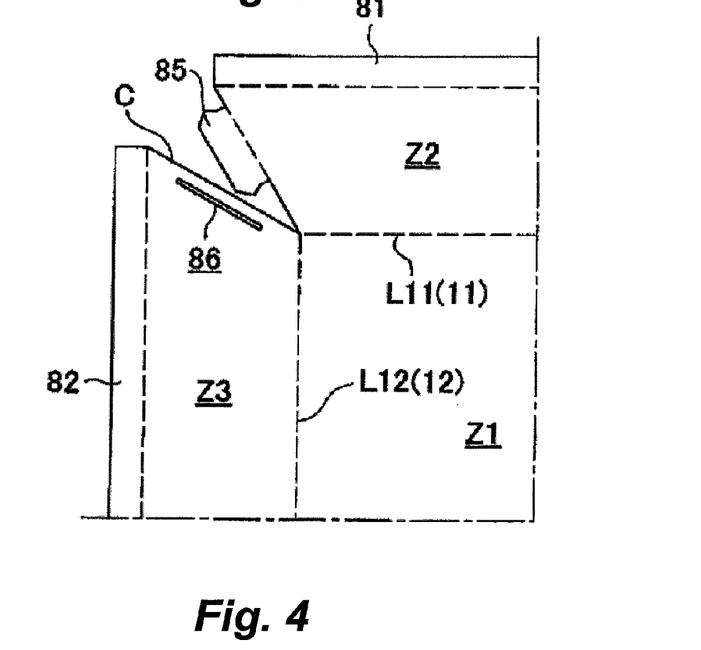
FIG. 4 is a detail development view of a light reflecting member in accordance with a second embodiment of the present invention.

Referring now to FIG. 4, a backlight device in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a double prime (").

FIG. 4 is a detail development view of the sheet 8" in accordance with the second embodiment. The sheet 8" has a coupling portion that couples the top and bottom peripheral regions Z2 and Z4 with the left and right peripheral regions Z3 and Z5, respectively. The coupling portion includes four insertion tabs 85 (e.g., tongue parts) and four slits 86. The insertion tabs 85 are provided to and extend from horizontal end portions (e.g., side end portions) of the peripheral regions Z2 and Z4. The slits 86 are formed at vertical end portions (e.g., side end portions) of the peripheral regions Z3 and Z5. Each of the insertion tabs 85 is inserted into the corresponding one of the slits 86. For example, the insertion tab 85 is provided to the end of one peripheral region (such as the peripheral region Z2 in FIG. 4) out of any one of the adjacent pairs of the peripheral regions (such as the peripheral regions Z2 and Z3 in FIG. 4) that are adjacent to one another and flank one of the corners of the center region Z1. The slit 86 is formed at the end of the other peripheral region (such as the peripheral region Z3 in FIG. 4). The insertion tab 85 is inserted into the slit 86, and latched to the slit 86 to couple the one peripheral region with the other peripheral region. The insertion tab 85 can also be formed at the end of one peripheral region out of any one of the adjacent pairs of the peripheral regions (e.g., the peripheral regions Z3 and Z4, the peripheral regions Z4 and Z5, the peripheral regions Z5 and Z2, etc.) that are adjacent to one another and flank one of the corners of the center region Z1, and the slit 86 can be formed in the other peripheral region.

With the sheet 8", the sheet 8" can be held in the shape shown in FIG. 2 by bending at an angle along the bending lines L11, L12, L13, and L14. The insertion tabs 85 on the one peripheral regions are inserted into the insertion slits 86 on the other peripheral regions from either inside or outside of the one peripheral regions. When the insertion tabs 85 are thus inserted into the slits 86, the adjacent pairs of the peripheral regions (the peripheral regions Z2 and Z3, the peripheral regions Z3 and Z4, the peripheral regions Z4 and Z5, and the peripheral regions Z5 and Z2) are linked at the places where the insertion tabs 85 are inserted into the slits 86. Accordingly, this improves the ability of the sheet 8" to maintain the shape shown in FIG. 2. As a result, the stability of light reflection by the sheet 8" is increased. Furthermore, it becomes less likely that the brightness of the liquid crystal cell is uneven.

General Interpretation of Terms

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a liquid crystal module equipped with the present invention. Accordingly, these terms, as utilized to describe the present invention should be interpreted relative to a liquid crystal module equipped with the present invention as used in the normal operating position.

While selected embodiments have been chosen to illustrate the present invention, it will be apparent to those skilled in the art from these disclosures that various changes and modifications can be made herein without departing from the scope of the invention as defined in the appended claims. Furthermore, the foregoing descriptions of the selected embodiments according to the present invention are provided for illustration only, and not for the purpose of limiting the invention as defined by the appended claims and their equivalents.

What is claimed is:

1. A backlight module comprising:
   at least one light source configured to emit light;
   a light reflecting member arranged to reflect the light emitted from the light source, the light reflecting member including
      a center reflecting part having two first opposite side portions and two second opposite side portions,
      two first peripheral reflecting parts each having a first trapezoidal shape with a first lower base and a first upper base that is longer than the first lower base, the first lower bases being connected to the first opposite side portions of the center reflecting part, respectively, such that the first peripheral reflecting parts extend from the first opposite side portions of the center reflecting part, respectively,
      two second peripheral reflecting parts each having a second trapezoidal shape with a second lower base and a second upper base that is longer than the second lower base, the second lower bases being connected to the second opposite side portions of the center reflecting part, respectively, such that the second peripheral reflecting parts extend from the second opposite side portions of the center reflecting part, respectively, and
      two extension parts extending from either the first upper bases or the second upper bases, respectively, with the center reflecting part, the first peripheral reflecting parts, the second peripheral reflecting parts and the extension parts being integrally formed as a one-piece, unitary member; and
   a frame including a bottom part, two first side parts and two second side parts, the first and second side parts extending frontward from peripheral portions of the bottom part, respectively, the first and second side parts defining an interior of the frame therebetween,
   the light reflecting member being arranged with respect to the frame while the light reflecting member is attached to the frame such that the center reflecting part, the first peripheral reflecting parts and the second peripheral reflecting parts are disposed within the interior of the frame, and such that the extension parts are disposed on either the first side parts or the second side parts, respectively,
   side end portions of an adjacent pair of the first peripheral reflecting parts and the second peripheral reflecting parts abutting against each other to form a corner section of the light reflecting member at a corner portion of the center reflecting part while the light reflecting member is attached to the frame,
   the light reflecting member further including a tongue part that extends from one of the side end portions of the adjacent pair of the first peripheral reflecting parts and the second peripheral reflecting parts towards the other of the side end portions of the adjacent pair of the first peripheral reflecting parts and the second peripheral reflecting parts,
   the tongue part of the light reflecting member at least partially overlapping with the other of the side end portions of the adjacent pair of the first peripheral reflecting parts and the second peripheral reflecting parts while the light reflecting member is attached to the frame,
   the tongue part of the light reflecting member having a distal edge extending between first and second ends of the tongue part, with the first end of the tongue part being located closer to the corner portion of the center reflecting part than the second end of the tongue part,
   a distance between the distal edge of the tongue part and the other of the side end portions of the adjacent pair of the first peripheral reflecting parts and the second peripheral reflecting parts increasing as approaching the second end of the tongue part from the first end of the tongue part along the distal edge of the tongue part.

2. The backlight module according to claim 1, wherein the extension parts of the light reflecting member are arranged parallel to the center reflecting part of the light reflecting member while the light reflecting member is attached to the frame.

3. The backlight module according to claim 2, wherein the light reflecting member has a first depth measured between the center reflecting part and the extension parts in a direction perpendicular to the center reflecting part while the light reflecting member is attached to the frame, and
the frame has a second depth measured between an inner surface of the bottom part and a top surface of one of the first and second side parts in a direction perpendicular to the inner surface of the bottom part, with the second depth of the frame being larger than the first depth of the light reflecting member such that the center reflecting part of the light reflecting member is spaced apart from the inner surface of the bottom part while the light reflecting member is attached to the frame.

4. The backlight module according to claim 3, wherein the light reflecting member is further arranged with respect to the frame while the light reflecting member is attached to the frame such that an inner edge of one of the extension parts is aligned with an inner edge of the top surface of one of the first and second side parts on which the one of the extension parts is disposed as viewed in the direction perpendicular to the center reflecting part.

5. The backlight module according to claim 1, further comprising
a plurality of optical sheets disposed on the light reflecting member such that the optical sheets at least partially overlap with the extension parts of the light reflecting member as viewed in a direction perpendicular to the center reflecting part while the light reflecting member is attached to the frame.

6. The backlight module according to claim 1, wherein
the light reflecting member further includes two additional extension parts extending from either the first upper bases or the second upper bases, from which the extension parts do not extend, respectively, and
the light reflecting member is further arranged with respect to the frame while the light reflecting member is attached to the frame such that the additional extension parts of the light reflecting member are disposed on either the first side parts or the second side parts, on which the extension parts are not disposed, respectively.

7. The backlight module according to claim 1, wherein
the extension parts of the light reflecting member are disposed along entire lengths of either the first upper bases or the second upper bases, respectively.

8. The backlight module according to claim 7, wherein
the extension parts of the light reflecting member have a rectangular shape.

9. The backlight module according to claim 7, wherein
the extension parts have a first width measured in a widthwise direction perpendicular to a lengthwise direction of the extension parts, and
either the first side parts or the second side parts on which the extension parts are disposed have a second width measured in the widthwise direction, with the second width being larger than the first width.

10. The backlight module according to claim 1, wherein
the first peripheral reflecting parts of the light reflecting member each have an isosceles trapezoidal shape as the first trapezoidal shape, and
the second peripheral reflecting parts of the light reflecting member each have an isosceles trapezoidal shape as the second trapezoidal shape.

11. The backlight module according to claim 1, wherein
the first peripheral reflecting parts are slanted with respect to the center reflecting part such that the first peripheral reflecting parts extend inwardly away from the first side parts of the frame, respectively, as the first peripheral reflecting parts approach the center reflecting part, respectively, and
the second peripheral reflecting parts are slanted with respect to the center reflecting part such that the second peripheral reflecting parts extend inwardly away from the second side parts of the frame, respectively, as the second peripheral reflecting parts approach the center reflecting part, respectively.

12. The backlight module according to claim 11, wherein
a side end portion of one of the first peripheral reflecting parts abuts against a side end portion of one of the second peripheral reflecting parts that is adjacent to the one of the first peripheral reflecting parts to form a corner section of the light reflecting member at a corner portion of the center reflecting part with the corner portion of the center reflecting part being located between the one of the first peripheral reflecting parts and the one of the second peripheral reflecting parts,
the light reflecting member further includes a tongue part that extends from one of the side end portions of the first and second peripheral reflecting parts towards the other of the side end portions of the first and second peripheral reflecting parts, and
the tongue part of the light reflecting member at least partially overlaps with the other of the side end portions of the first and second peripheral reflecting parts while the light reflecting member is attached to the frame.

13. The backlight module according to claim 1, wherein
one of the first and second side parts of the frame extends perpendicularly frontward with respect to the bottom part such that the one of the first and second side parts of the frame and corresponding one of the first and second peripheral reflecting parts that is adjacently opposite the one of the first and second side parts of the frame define a spacing therebetween while the light reflecting member is attached to the frame.

14. The backlight module according to claim 1, wherein
at least one of the first and second side parts of the frame has an outer surface that is perpendicular to the bottom part of the frame.

15. The backlight module according to claim 1, wherein
either the first peripheral reflecting parts or the second peripheral reflecting parts are oriented with respect to the center reflecting part while the light reflecting member is attached to the frame such that angles defined between the center reflecting part and either the first peripheral reflecting parts or the second peripheral reflecting parts are equal to each other.

16. The backlight module according to claim 15, wherein
either the first side parts of the frame or the second side parts of the frame are oriented with respect to the bottom part of the frame such that angles defined between the bottom part and either the first side parts or the second side parts are equal to each other.

17. The backlight module according to claim 1, wherein
the first opposite side portions of the center reflecting part are longer than the second opposite side portions of the center reflecting part, respectively.

18. The backlight module according to claim 17, further comprising
a plurality of light sources arranged with respect to the frame, the light sources being connected to a plurality of electric connectors, respectively, the electric connectors being arranged closer to one of the second side parts of the frame than the other of the second side parts of the frame.

19. The backlight module according to claim 18, wherein
the light sources are symmetrically arranged relative to the frame with respect to a horizontal center plane of the backlight module.

20. The backlight module according to claim 19, wherein
the light reflecting member further has a plurality of openings located on the center reflecting part, the light sources being supported with respect to the frame via light source supports that are disposed through the openings of the light reflecting member.

21. The backlight module according to claim 20, wherein
the light reflecting member further has a plurality of through holes with continuous periphery, the light sources being connected to the electric connectors through the through holes, respectively, the through holes being at least partially located on one of the second peripheral reflecting parts that is adjacently opposite the one of the second side parts of the frame while the light reflecting member is attached to the frame.

22. The backlight module according to claim 1, wherein the distal edge of the tongue part of the light reflecting member is disposed on a rear side of the other of the side end portions of the adjacent pair of the first peripheral reflecting parts and the second peripheral reflecting parts while the light reflecting member is attached to the frame.

23. The backlight module according to claim 1, wherein each of the side end portions of the adjacent pair of the first peripheral reflecting parts and the second peripheral reflecting parts has first and second ends, with the first end of each of the side end portions being located closer to the corner portion of the center reflecting part than the second end of each of the side end portions, and
the tongue part is entirely disposed within an area enclosed by the side end portions and an imaginary line extending between the second ends of the side end portions.

24. A backlight module comprising:
at least one light source configured to emit light;
a light reflecting member arranged to reflect the light emitted from the light source, the light reflecting member including
   a center reflecting part having two first opposite side portions and two second opposite side portions,
   two first peripheral reflecting parts each having a first trapezoidal shape with a first lower base and a first upper base that is longer than the first lower base, the first lower bases being connected to the first opposite side portions of the center reflecting part, respectively, such that the first peripheral reflecting parts extend from the first opposite side portions of the center reflecting part, respectively,
   two second peripheral reflecting parts each having a second trapezoidal shape with a second lower base and a second upper base that is longer than the second lower base, the second lower bases being connected to the second opposite side portions of the center reflecting part, respectively, such that the second peripheral reflecting parts extend from the second opposite side portions of the center reflecting part, respectively, and
   two extension parts extending from either the first upper bases or the second upper bases, respectively, with the center reflecting part, the first peripheral reflecting parts, the second peripheral reflecting parts and the extension parts being integrally formed as a one-piece, unitary member; and
a frame including a bottom part, two first side parts and two second side parts, the first and second side parts extending frontward from peripheral portions of the bottom part, respectively, the first and second side parts defining an interior of the frame therebetween,
the light reflecting member being arranged with respect to the frame while the light reflecting member is attached to the frame such that the center reflecting part, the first peripheral reflecting parts and the second peripheral reflecting parts are disposed within the interior of the frame, and such that the extension parts are disposed on either the first side parts or the second side parts, respectively,
side end portions of an adjacent pair of the first peripheral reflecting parts and the second peripheral reflecting parts abutting against each other to form a corner section of the light reflecting member at a corner portion of the center reflecting part while the light reflecting member is attached to the frame,
the side end portions of the adjacent pair of the first peripheral reflecting parts and the second peripheral reflecting parts defining an abutment interface while the light reflecting member is attached to the frame, the abutment interface extending from the corner portion of the center reflecting part in a direction that intersects with a diagonal of the center reflecting part that extends through the corner portion of the center reflecting part as viewed in a direction perpendicular to the center reflecting part,
the light reflecting member further including a tongue part that extends from one of the side end portions of the adjacent pair of the first peripheral reflecting parts and the second peripheral reflecting parts towards the other of the side end portions of the adjacent pair of the first peripheral reflecting parts and the second peripheral reflecting parts,
the tongue part of the light reflecting member at least partially overlapping with the other of the side end portions of the adjacent pair of the first peripheral reflecting parts and the second peripheral reflecting parts while the light reflecting member is attached to the frame,
the tongue part of the light reflecting member having a distal edge extending between first and second ends of the tongue part, with the first end of the tongue part being located closer to the corner portion of the center reflecting part than the second end of the tongue part,
a distance between the distal edge of the tongue part and the other of the side end portions of the adjacent pair of the first peripheral reflecting parts and the second peripheral reflecting parts increasing as approaching the second end of the tongue part from the first end of the tongue part along the distal edge of the tongue part.

25. The backlight module according to claim 24, wherein the distal edge of the tongue part of the light reflecting member is disposed on a rear side of the other of the side end portions of the adjacent pair of the first peripheral reflecting parts and the second peripheral reflecting parts while the light reflecting member is attached to the frame.

26. The backlight module according to claim 25, wherein each of the side end portions of the adjacent pair of the first peripheral reflecting parts and the second peripheral reflecting parts has first and second ends, with the first end of each of the side end portions being located closer to the corner portion of the center reflecting part than the second end of each of the side end portions, and
the tongue part is entirely disposed within an area enclosed by the side end portions and an imaginary line extending between the second ends of the side end portions.

* * * * *